United States Patent [19]
Brown

[11] Patent Number: 6,111,701
[45] Date of Patent: Aug. 29, 2000

[54] CHROMATIC ABERRATION CORRECTED MULTI-COLOR HEAD-UP DISPLAY SYSTEM

[75] Inventor: Robert D. Brown, Portland, Oreg.

[73] Assignee: Rockwell Collins, Inc., Cedar Rapids, Iowa

[21] Appl. No.: 09/352,101

[22] Filed: Jul. 14, 1999

[51] Int. Cl.[7] .................................................. G02B 27/14
[52] U.S. Cl. .......................................... 359/637; 359/634
[58] Field of Search .................................... 359/630, 634, 359/637

[56] References Cited

U.S. PATENT DOCUMENTS

| | | | |
|---|---|---|---|
| 3,858,046 | 12/1974 | Cubalchini | 359/727 |
| 4,541,688 | 9/1985 | Watt et al. | 350/171 |
| 4,560,233 | 12/1985 | Banbury | 350/3.7 |
| 4,652,870 | 3/1987 | Steward | 340/705 |
| 4,711,512 | 12/1987 | Upatnieks | 350/3.7 |
| 4,832,449 | 5/1989 | Mundy et al. | 350/174 |
| 4,842,389 | 6/1989 | Wood et al. | 350/3.7 |
| 4,927,234 | 5/1990 | Banbury et al. | 350/174 |
| 4,930,847 | 6/1990 | Cederquist | 350/3.6 |
| 4,961,625 | 10/1990 | Wood et al. | 350/174 |
| 4,993,788 | 2/1991 | Steward | 350/3.72 |
| 5,282,066 | 1/1994 | Yu et al. | 359/22 |
| 5,305,124 | 4/1994 | Chern et al. | 359/13 |
| 5,475,512 | 12/1995 | Nakazawa et al. | 359/13 |
| 5,684,634 | 11/1997 | Rogers | 359/630 |
| 5,710,668 | 1/1998 | Gohman et al. | 359/634 |

OTHER PUBLICATIONS

Ebert, J.C., "Color Holographic HUD," SID 93 Digest, Form No. ISSN0097–0966X/93/0000–0433, 1993, pp. 433–436.

Primary Examiner—Georgia Epps
Assistant Examiner—Ricky Mack
Attorney, Agent, or Firm—Nathan O. Jensen; Kyle Eppele; J. P. O'Shaughnessy

[57] ABSTRACT

A multi-color optical display system is designed with a bi-fold prism assembly in a relay lens that, together with a multi-spectrally reflecting optical combiner, longitudinally corrects a multi-colored image composed of two or more discrete wavelengths of light. The prism assembly for a preferred two-color image typically includes three light reflecting surfaces, the first of which may be flat or curved and coated with a spectrally reflective coating of a given wavelength; the second of which is flat or curved, coated with a spectrally reflective coating of a given second wavelength, and spaced a small amount from the first surface; and the third of which is flat, separated from the first two by a large distance and angle, and uncoated. The coatings are chosen to each reflect a specific wavelength range of colored light used in the display system and to transmit all other wavelengths. The spacing between and/or curvatures of the first two surfaces are dictated by chromatic aberrations introduced by monochromatic optical elements used in the relay lens. Specifically, each surface is positioned so that the focal point of the corresponding color component in an intermediate image created by the relay lens is located at the focal point of the combiner, so that the final virtual image reflected by the combiner is longitudinally color corrected.

3 Claims, 4 Drawing Sheets

CHROMATIC ABERRATION CORRECTED MULTI-COLOR HEAD-UP DISPLAY SYSTEM

TECHNICAL FIELD

This invention relates to vehicle head-up display ("HUD") systems and, in particular, to such a HUD system in which chromatic aberrations introduced by monochromatic relay lens components are minimized by implementing the relay lens with lens components that provide different optical paths for different colors of light so that they are brought to focus at the same location.

BACKGROUND OF THE INVENTION

HUD systems are currently used in aircraft to provide pilots with essential information superimposed onto their forward field of view through the aircraft windshield. The information displayed is typically data or symbolic images indicative of flight conditions, such as the operating condition of the aircraft, environmental information, or guidance information. HUD systems are also being designed for use in automobiles and other vehicles.

Conventional single-color HUDs include a single-color light source, a monochromatic relay lens to project the light propagating from the single-color light source, and a collimator with a combiner to provide a collimated single-color final image to the viewer. When multi-colored light passes through the multiple optical lenses of the monochromatic relay lens, the different wavelengths of light are refracted to propagate along different paths to different points of focus, resulting in an unfocused image. Apochromatic relay lenses (i.e., relay lenses implemented with many lens elements to achieve color correction by dispersion compensation), which bring different wavelengths of light to the same focus, are prohibitively expensive to manufacture and are, therefore, impractical for use in HUD systems.

A completely focused multi-colored image display would have many advantages over a single-color display. Symbols or other information in different colors could be used in a HUD system to provide different degrees of emphasis for the information presented. A color change could be used as an emergency or warning message, an enunciator, or an indicator of, for example, mode changes or out-of-tolerance conditions. A color change could also be used to indicate that an input parameter is being updated, or that immediate action is required by the pilot.

U.S. Pat. No. 5,710,668 for MULTI-COLOR HEAD-UP DISPLAY SYSTEM, which is assigned to the assignee of this patent application, describes a HUD system in which a multi-powered reflective combiner, together with a monochromatic or partly color-corrected relay lens, longitudinally corrects a multi-colored image. The combiner includes at least two curved surfaces of different optical powers. The curved surfaces carry light reflective coatings that reflect different specific wavelength ranges of colored light used in the system and transmit all other wavelengths. The curvature of each coated combiner surface is dictated by the aberrations in the color image created by the relay lens. Specifically, each coated combiner surface is positioned so that its focus coincides with the focal point of the corresponding color component in an intermediate image created by the relay lens so that the final virtual image reflected by the combiner is longitudinally color corrected. One drawback is that the light reflective coatings in a color-correcting combiner provide somewhat diminished visual transparency and clarity as compared with that provided by a conventional combiner.

SUMMARY OF THE INVENTION

An object of this invention is, therefore, to provide a multi-color HUD system that is capable of displaying correctly focused image information in more than one color.

Another object of this invention is to provide a multi-colored HUD system having an achromatic lens implemented over multiple wavelength ranges in the absence of dispersion compensating refractive elements.

This invention is a vehicle HUD system that displays information in more than one color. In a preferred embodiment for use in an aircraft, a light source emits a colored image carried by multiple wavelengths of light in response to signals generated by an image signal controller. The light rays carrying the colored image propagate through a color-correcting relay lens composed of monochromatic lens elements that introduce color aberrations into the different wavelengths of light passing through it. A chromatic aberration compensating optical component or color-correcting prism assembly positioned within the relay lens differentially reflects the color-aberrated light rays toward a multi-spectrally reflecting combiner. The combiner reflects light rays propagating from the relay lens toward a pilot, who views the image as it is superimposed on an outside world scene in the same field of view. The color-correcting prism assembly is constructed to have multiple spectrally reflecting surfaces of different optical powers that correct for the aberrations introduced by the monochromatic lens elements and thereby presents to the combiner a color-corrected image and to the pilot a correctly focused multi-colored final virtual image at or near optical infinity.

In a first preferred embodiment, the image source emits two wavelengths of light corresponding to green and red light. A color-correcting bi-fold prism assembly forming part of a relay lens comprises a first flat surface and a second curved surface that are spaced apart and provide different optical powers. The first and second surfaces carry respective first and second spectrally reflective coatings that reflect different ranges of wavelengths of light emitted by the image source. The green light is reflected by the first spectrally reflective coating on the first surface, and the red light is transmitted by the first spectrally reflective coating but reflected by the second spectrally reflective coating on the second surface. The spacing between and/or curvatures of the first and second surfaces are set to compensate for the chromatic aberrations introduced by the monochromatic lens elements. The first and second surfaces reflect their corresponding ranges of wavelengths of light so that they propagate along different optical path lengths and converge to a common focal point at an intermediate range. The light in these wavelength ranges is thereby free from longitudinal color aberrations that would distort the final virtual image reflected by the combiner and displayed at or near optical infinity to the pilot.

In a second preferred embodiment, a color-correcting bi-fold prism assembly forming part of a relay lens comprises three light reflecting surfaces, one flat surface and two curved surfaces of different optical powers, carrying three different spectrally reflective coatings to provide an aberration-free three-color image.

Additional objects and advantages of this invention will be apparent from the detailed description of preferred embodiments which proceeds with reference to the accompanying drawings.

DETAILED DESCRIPTION OF PREFERRED EMBODIMENTS

Figure 1:
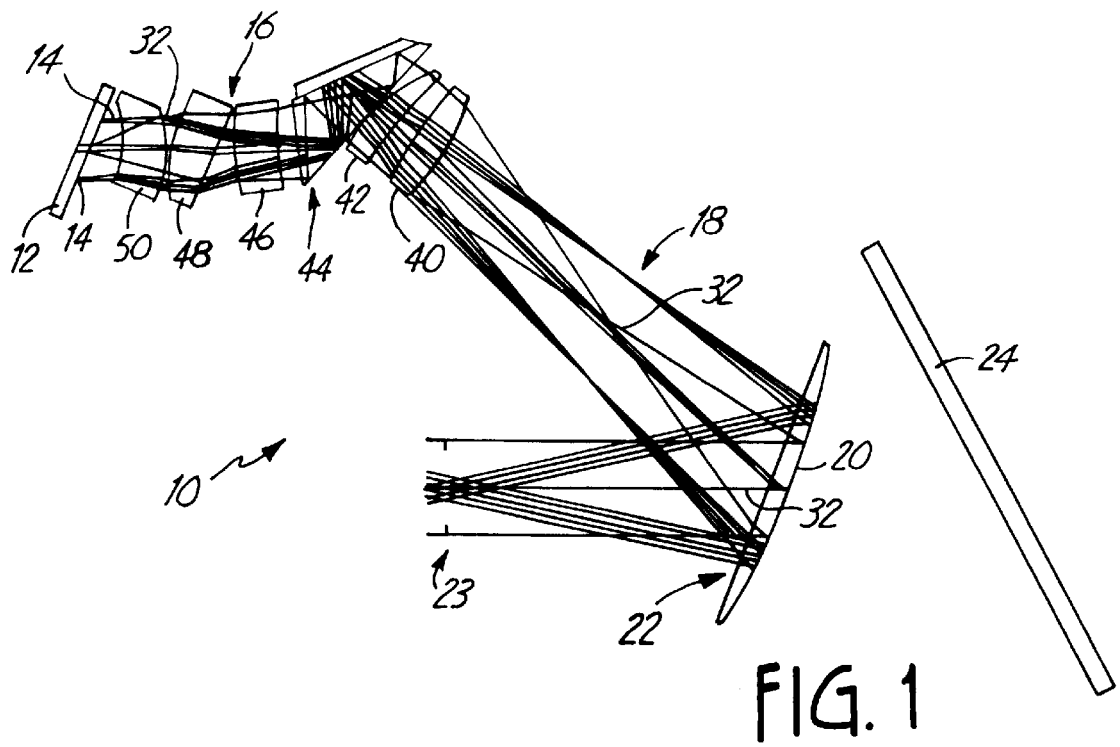
FIG. 1 is a ray trace diagram of an optical display system of the invention constructed with a relay lens having a color-correcting bi-fold prism assembly for installation as an aircraft head-up display.

FIG. 1 shows a multi-color optical head-up display ("HUD") system 10 of this invention that is preferably installed in an aircraft. System 10 includes an image source 12 that produces multi-colored image-carrying light rays 14 that propagate through a color-correcting relay lens 16 to create an intermediate image 18. Image 18 carried by light rays 14 are reflected by a multi-spectrally reflecting collimating combiner 20 to create a final image 22 that is viewed at the pilot's eye reference point 23. Combiner 20 superimposes final virtual image 22 at or near optical infinity on an outside world scene (not shown) that the pilot sees through a windshield 24.

Image source 12 is preferably a cathode-ray tube that emits a multi-colored image, including a green component 26 (FIG. 3) carried by multiple wavelengths of light in the range of about 540–560 nanometers (nm) and a red component 28 (FIG. 3) carried by multiple wavelengths of light in the range of about 610–640 nm. In a second embodiment (FIG. 4), the multi-colored image includes a blue component 30 carried by multiple wavelengths of light in the range of about 470–500 nm. Other colors of light may also be used. Image source 12 emits the color components of the multi-colored image in a conventional field sequential manner so that the color components are laterally color corrected as they propagate generally along a light path 32 toward relay lens 16.

Figure 6:
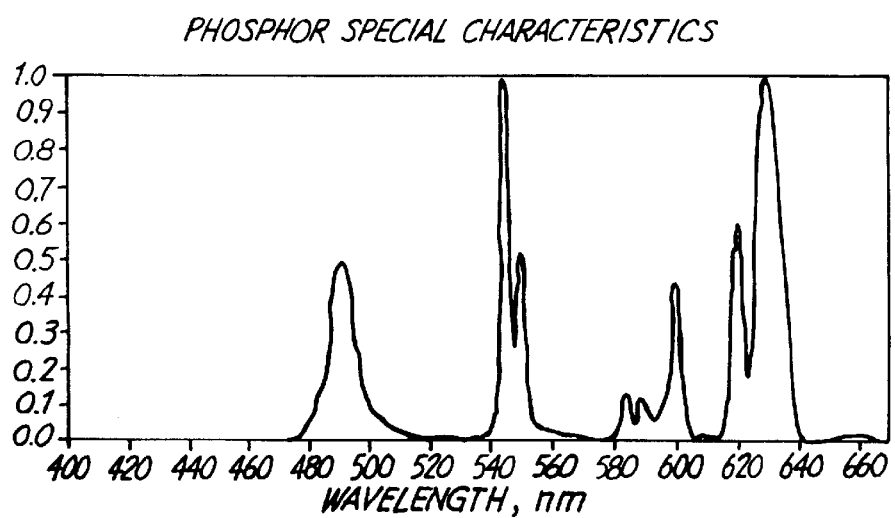
FIG. 6 is a graph showing the light emission spectral characteristics of the phosphor used in the cathode-ray tube light source of FIG. 1.

Relay lens 16 transfers the image produced by image source 12 to combiner 20. Relay lens 16 preferably is a color-correcting lens array configured in a first preferred embodiment to transfer two colors of light having a ranges of wavelengths centered at about 544 nm (i.e., green light) and about 625 nm (i.e., red light) that are typically produced by a cathode-ray tube constructed with a combination of P22R and P43 phosphors having spectral properties similar to those shown in FIG. 6.

Relay lens 16 includes between five and twelve, and typically six, optical lens elements that cooperate to form a focused, multiple-color intermediate image. Lens elements 40, 42, 44, 46, 48, and 50 each have specially configured curved surfaces and thicknesses that cooperate to bend or redirect the optical path of the multi-colored light as it propagates through relay lens 16. Lens elements 40, 42, 46, 48, and 50 refract different wavelengths of light to propagate along different optical paths to different points of focus. Lens element 44 is a color-correcting bi-fold prism assembly that creates separate optical paths for the different wavelengths of light to offset optical path length differences introduced by the other relay lens elements and thereby cause the focal point of each wavelength of light to converge in intermediate image 18 at the focal point of combiner 20. The radii of the curved surfaces and the thicknesses of the lens elements can be determined by a person sufficiently skilled to use commercially available ray trace programs such as the Code V or Oslo Six software analysis and design program. Intermediate image 18 is reflected by collimating combiner 20 to create final virtual image 22 that has a focal point at infinity for each wavelength of light the pilot views from eye reference point 23.

Figure 2:
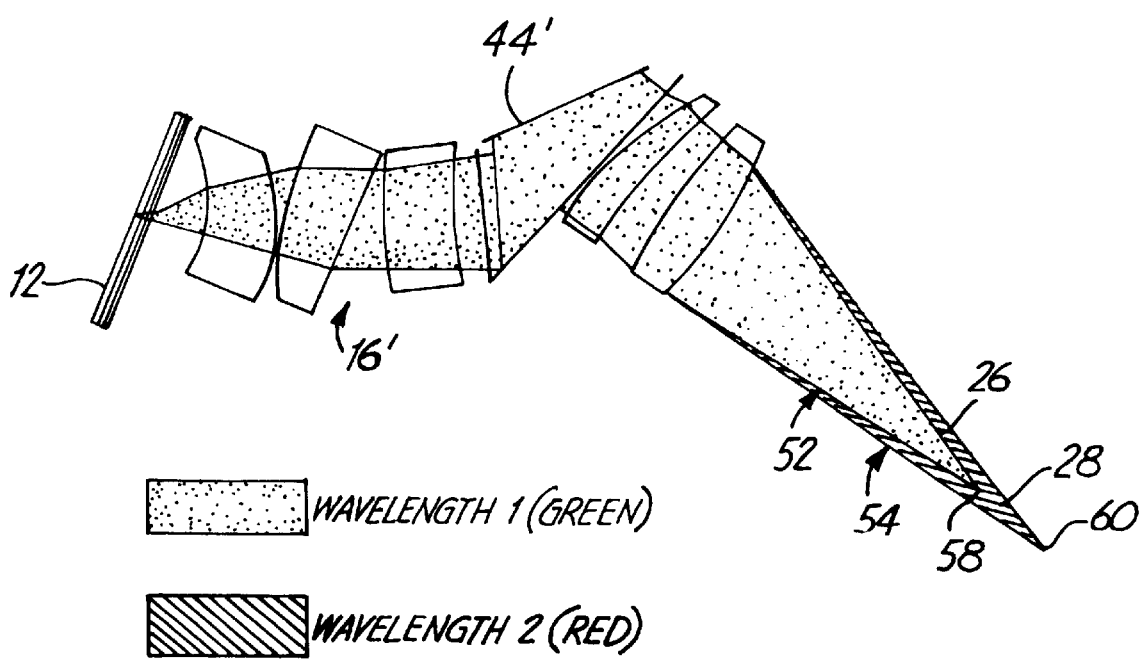
FIG. 2 is a ray trace diagram of a prior art optical display system implemented with a relay lens without color correction in a bi-fold prism to show the different locations of intermediate image focal points for two wavelengths of light.

FIG. 2 illustrates the problem of convergence to two different focal points of two different wavelengths of light passing through a prior art monochromatic relay lens 16' implemented with a noncolor-correcting bi-fold prism 44'. The multiple colors of light carried by green light rays 26 and red light rays 28 emitted by light source 12 propagate through monochromatic relay lens 16'. The relay lens elements bend light rays 26 and 28 along different respective light paths 52 and 54 so that intermediate image 18 includes focal points 58 and 60 corresponding to the respective green and red color components. Focal points 58 and 60 are not coincident with each other so that intermediate image 18 can be described as being unfocused and having longitudinal color aberrations, the latter of which are also called axial chromatic aberrations. (FIG. 2 is greatly exaggerated to show the noncoincidence of focal points 58 and 60.)

Figure 3:
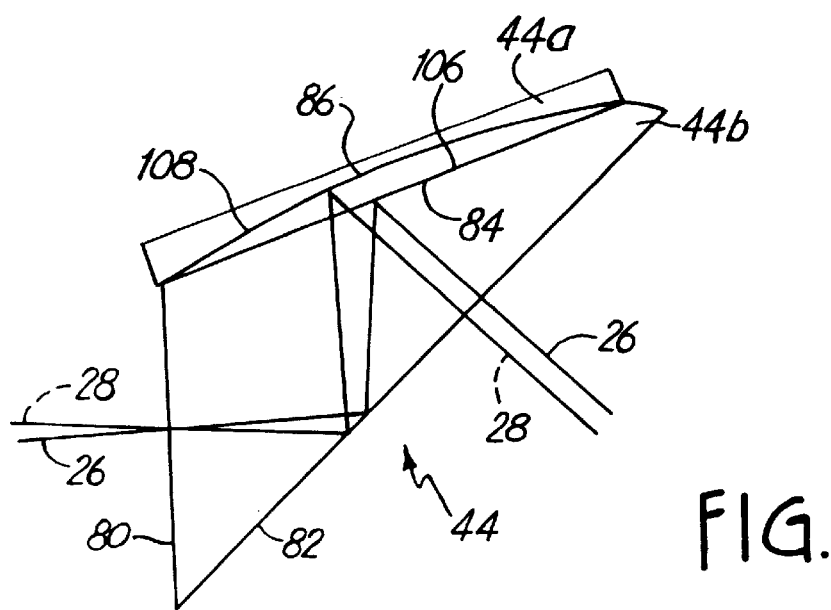
FIG. 3 is a first embodiment of a color-correcting bi-fold prism assembly having one flat surface and one curved surface coated with different spectrally reflective coatings to provide an aberration-free two-color image in the display system of FIG. 1.

To correct the longitudinal color aberrations of intermediate image 18, bi-fold prism assembly 44 of relay lens 16 includes multiple surfaces coated with multiple wavelength selective reflective coatings. FIG. 3 shows a first preferred embodiment of color-correcting bi-fold prism assembly 44 of relay lens 16 through which green light rays 26 and red light rays 28 propagate. Prism assembly 44 is composed of a plano-concave lens 44a cemented by optical epoxy adhesive to a surface of a bi-fold prism 44b. The multi-colored light enters prism assembly 44 at an entrance surface 80 and is totally internally reflected by surface 82. Green light rays 26 are reflected by a green spectrally reflective coating applied to a surface 84, which is flat, and red light rays 28 are reflected by a red spectrally reflective coating applied to a surface 86, which is separated from surface 84 by the required optical path difference for the green and red wavelengths. (Surface 84 is located at the interface between lens 44a and prism 44b. The gap between surfaces 84 and 86, the maximum spacing between them being about 0.1 mm, is filled with epoxy adhesive.) Surface 86 may be a flat or curved surface; and, in the embodiment shown, surface 86 is concave curved. The reflected light of the green and red wavelengths propagates through and exits prism assembly 44 at surface 82. The green light rays 26 and red light rays 28 emerge from relay lens 16 and simultaneously come to focus at intermediate image 18 (FIG. 1.).

Flat surface 84 of prism assembly 44 carries a wavelength selective reflective coating 106 that reflects wavelengths corresponding to green light rays 26 and transmits the wavelengths of light of all other colors. Concave curved surface 86 of prism assembly 44 carries a wavelength selective reflective coating 108 that reflects wavelengths corresponding to red light rays 28 and transmits the wavelengths of light of all other colors.

Figure 5:
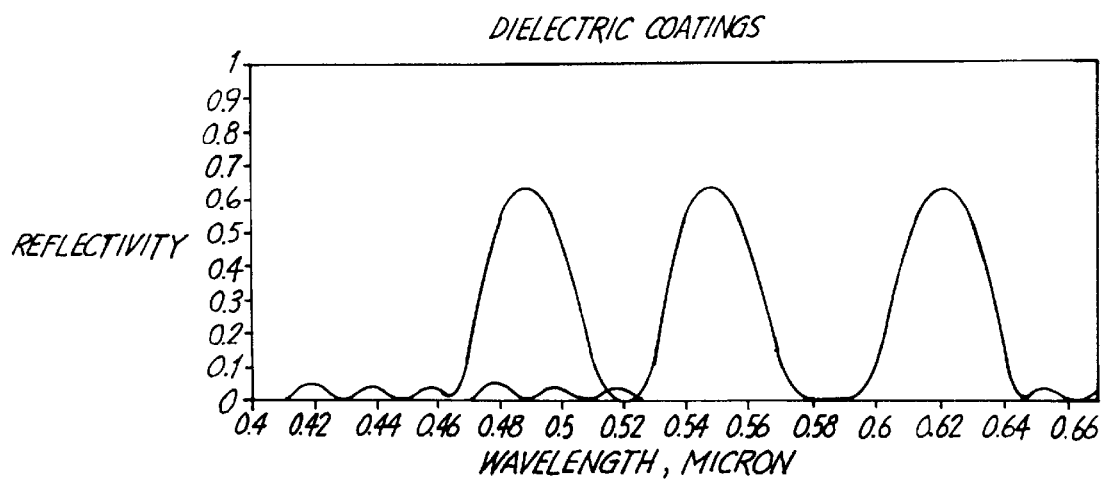
FIG. 5 is a graph showing the light reflection spectral characteristics of three types of the spectrally reflective coatings used in the preferred embodiments of the bi-fold prism assemblies shown in FIGS. 3 and 4.

Coating 106 is preferably a dielectric material coated on surface 84 and having a reflectivity of greater than approximately 60% (FIG. 5) over a 540–560 nm range, which corresponds to the wavelengths of green light rays 26. Coating 108 is preferably a dielectric coating coated on surface 86 and having a reflectivity of greater than approximately 60% (FIG. 5) over a 610–640 nm range, which corresponds to the wavelengths of red light rays 28. The wavelength selective reflective coatings of combiner 20 may also be fabricated of thin film, photopolymer, or rugate material and may be applied by spraying, evaporating, or rolling onto the substrate surfaces.

Tables 1 and 2 summarize the design specifications for and the spacings between adjacent optical surfaces of color-correcting prism assembly 44. The surfaces 80, 82, 84, and 86 represent actual surfaces shown in FIG. 3, and the surfaces 4, 5, 6, and 7 are either dummy or repeat surfaces not drawn in FIG. 3. Surfaces 4–7 are required for accurate optical modeling using a sequential ray trace. The data are presented in Oslo format. Table 1 gives the radius of curvature and aperture radius of each surface, and with the exception of spherical surface 86, all surfaces are flat. The thickness indicates the axial distance to the next adjacent surface. Table 2 gives tilt/decenter data, in which X, Y, and Z and A, B, and C represent Oslo format data coordinates. Dimensions are given in millimeters.

TABLE 1

LENS DATA

| SURFACE | RADIUS | THICKNESS | APERTURE RADIUS | GLASS |
|---|---|---|---|---|
| 82 | — | −1.250000 | 2.524500 | S-TIH10 |
| 84 | — | −0.004283 | 2.530000 | BK7 |
| 86 | 759.161484 | — | 2.550000 | REFLECT |
| 4 | — | 0.004283 | 2.550000 | BK7 |
| 5 | — | 1.649980 | 2.750000 | S-TIH10 |
| 6 | — | — | 2.530000 | REFLECT |
| 7 | — | −1.000000 | 2.750000 | S-TIH10 |
| 80 | — | — | 1.892440 | AIR |

TABLE 2

TILT/DECENTER DATA

| 82 | DT | 1 | DCX | — | DCY | — | DCZ | — |
|---|---|---|---|---|---|---|---|---|
|  | GC | 1 | TLA | — | TLB | — | TLC | — |
| 84 | DT | 1 | DCX | — | DCY | — | DCZ | — |
|  |  |  | TLA | −23.000000 | TLB | — | TLC | — |
| 6 | DT | 1 | DCX | — | DCY | −0.687979 | DCZ | — |
|  |  |  | TLA | 23.000000 | TLB | — | TLC | — |
| 7 | DT | 1 | DCX | — | DCY | — | DCZ | — |
|  |  |  | TLA | 36.000000 | TLB | — | TLC | — |
| 80 | DT | 1 | DCX | — | DCY | — | DCZ | — |
|  |  |  | TLA | 12.772574 | TLB | — | TLC | — |

As shown in FIG. 1, when light rays 26 and 28 propagate along light path 32 from image source 12 to the location of intermediate image 18, coating 106 on surface 84 reflects green light rays 26 and transmits all other light rays so that red light rays 28 propagate through coating 106 and are reflected by coating 108. Coatings 106 and 108 cooperate, therefore, with prism assembly surfaces 80 and 82 to correct the longitudinal color aberrations of intermediate image 18 by producing final virtual image 22 that is focused at near infinity, i.e., the light rays are nearly parallel, for each of the multiple wavelengths of light.

Figure 4:
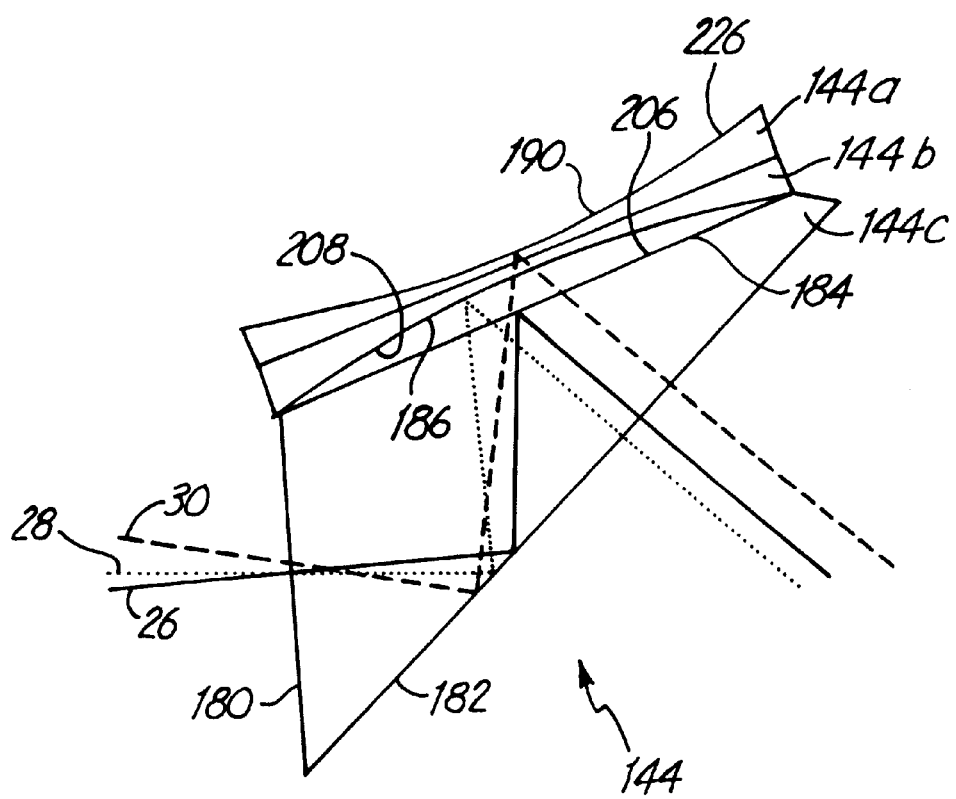
FIG. 4 is a second embodiment of a color-correcting bi-fold prism assembly having one flat surface and two curved surfaces of different optical powers, the three surfaces coated with different spectrally reflective coatings to provide an aberration-free three-color image in the display system of FIG. 1.

FIG. 4 shows a second preferred embodiment of a color-correcting bi-fold prism assembly 144 of relay lens 16 through which green light rays 26, red light rays 28, and blue light rays 30 propagate. Prism assembly 144 is composed of a pair of plano-concave lenses 144a and 144b, positioned face-to-face and cemented together at their flat surfaces, and a bi-fold prism 144c cemented to lens 144b. The multi-colored light enters prism assembly 144 at an entrance surface 180 and is totally internally reflected by surface 182. Green light rays 26 are reflected by a green spectrally reflective coating applied to a surface 184, which is flat, and red light rays 28 are reflected by a red spectrally reflective coating applied to a surface 186, which is separated from surface 184 by the required optical path difference for the green and red wavelengths. Surface 186 may be a flat surface or a curved surface; and in the embodiment shown, surface 186 is concave curved. The reflected light of red and green wavelengths propagates through and exits prism assembly 144 at surface 182. The green light rays 26 and red light rays 28 emerge from relay lens 16 and simultaneously come to focus at intermediate image 18 (FIG. 1). Blue light rays 30 are reflected by a blue spectrally reflective coating applied to a concave curved surface 190 of lens 144a. The curvature of curved surface 190 is set to bring blue light rays 30 to the same focus in intermediate image 18 as that of green light rays 26 and red light rays 28.

Flat surface 184 of prism assembly 144 carries a wavelength selective reflective coating 206 that reflects wavelengths corresponding to green light rays 26 and transmits all other colors of light. Convex curved surface 186 of prism assembly 144 carries a wavelength selective coating 208 that reflects wavelengths corresponding to red light rays 28 and transmits the wavelengths of light of all other colors. Coatings 206 and 208 are preferably of the same type and have the same properties as those of coatings 106 and 108, respectively. Rear concave curved surface 190 of lens 144a carries a wavelength selective coating 226 that reflects wavelengths corresponding to blue light rays 30 and transmits all other colors of light. Coating 226 is preferably a dielectric material having a reflectivity of greater than approximately 60% (FIG. 5) over a 470–500 nm range, which corresponds to the wavelengths of blue light rays 30. The three wavelengths of light reflected by combiner 20 are, therefore, nearly parallel and focused at near infinity in final virtual image 22.

Multi-color HUD system 10 includes, therefore, a relay lens 16 implemented with a color-correcting prism assembly 44 or 144 that corrects longitudinal color aberrations of intermediate image 18 introduced by the monochromatic optical elements of relay lens 16. System 10 presents to the pilot a correctly collimated multi-colored final virtual image 22 that has a focal point at near infinity and is superimposed on an outside world view.

It will be obvious to those having skill in the art that many changes may be made to the details of the above-described embodiments of this invention without departing from the underlying principles thereof. For example, although the lens elements (other than the color-correcting prism) of relay lens 16 are of monochromatic design, partly color-corrected lens elements could be substituted for some or all the lens elements as part of an optimized overall optical system design. The scope of this invention should, therefore, be determined only by the following claims.

I claim:

1. A multi-color optical display system for producing longitudinally color-corrected multi-colored images and presenting them for observation in combination with an observer's visual exterior view of an outside world scene, comprising:

an image source providing a multi-colored image carried by multiple wavelengths of light propagating along an optical path;

an optical combiner positioned so that an observer can see the exterior view through it and so that at least some of the multiple wavelengths of light reflect off the combiner to provide an image for observation by the observer;

a lens positioned along the optical path between the combiner and the image source but out of the observer's direct exterior view to receive the multi-colored image, the lens including optical components that introduce longitudinal color aberrations into the multiple wavelengths of light as they propagate through the lens, and the lens including a chromatic aberration compensating optical component having multiple spaced-apart, partly light reflecting and transmitting surfaces carrying spectrally reflective coatings that reflect different wavelength ranges of colored light to provide separate color correcting optical paths of different optical lengths for the multiple wavelengths of light in the respective wavelength ranges of colored light of the spectrally reflective coatings;

the chromatic aberration compensating optical component of the lens cooperating with the combiner to reflect the multiple wavelengths of light propagating from the lens to present to the observer a multi-colored final image superimposed on the outside world scene and substantially free from longitudinal color aberrations; and wherein the chromatic aberration compensating optical component comprises a bi-fold prism assembly that includes first and second light reflecting surfaces carrying spectrally reflective coatings of respective first and second wavelengths and a third light reflecting surface carrying no spectrally reflective coating.

2. The system of claim 1 in which the first and second light reflecting surfaces are spaced-apart from each other by a first distance and from the third light reflecting surface by a distance that is substantially longer than the first distance.

3. The system of claim 1 in which at least one of the three light reflecting surfaces is flat.

\* \* \* \* \*